US008825740B2

(12) United States Patent
Catorcini et al.

(10) Patent No.: US 8,825,740 B2
(45) Date of Patent: Sep. 2, 2014

(54) SMART, SEARCH-ENABLED WEB ERROR PAGES

(75) Inventors: Alessandro P. Catorcini, Redmond, WA (US); Amy J. Michaels, Mercer Island, WA (US); Fabrice Canel, Redmond, WA (US); Mark Hahn, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 481 days.

(21) Appl. No.: 12/257,067

(22) Filed: Oct. 23, 2008

(65) Prior Publication Data

US 2010/0106571 A1    Apr. 29, 2010

(51) Int. Cl.
*G06F 15/16*    (2006.01)
*G06Q 30/02*    (2012.01)
*G06F 17/30*    (2006.01)
*G06F 15/173*   (2006.01)
*G06F 7/00*     (2006.01)

(52) U.S. Cl.
CPC ........ *G06F 17/3089* (2013.01); *G06Q 30/0241* (2013.01); *G06Q 30/02* (2013.01)
USPC ........... 709/203; 709/206; 709/217; 709/239; 707/728

(58) Field of Classification Search
CPC . G06F 17/3089; G06Q 30/02; G06Q 30/0241
USPC ............... 709/203, 206, 217, 239; 707/728
See application file for complete search history.

(56) References Cited

U.S. PATENT DOCUMENTS

| | | | |
|---|---|---|---|
| 6,202,087 B1 * | 3/2001 | Gadish ........................ | 709/206 |
| 6,594,697 B1 | 7/2003 | Praitis et al. | |
| 6,895,430 B1 | 5/2005 | Schneider | |
| 7,325,045 B1 * | 1/2008 | Manber et al. ............... | 709/219 |
| 2002/0056053 A1 | 5/2002 | Vine | |
| 2003/0131005 A1 | 7/2003 | Berry | |
| 2007/0022419 A1 | 1/2007 | Subbarao | |
| 2007/0033264 A1 * | 2/2007 | Edge et al. ................... | 709/217 |
| 2007/0088801 A1 * | 4/2007 | Levkovitz et al. ........... | 709/217 |

OTHER PUBLICATIONS

Barry Schwartz, "Google Launches Enhanced 404 Widget," Aug. 19, 2008, http://searchengineland.com/google-launches-enhanced-404-widget-14594.php, pp. 1-4.

* cited by examiner

*Primary Examiner* — David Lazaro
*Assistant Examiner* — Vitali Korobov
(74) *Attorney, Agent, or Firm* — Dave Ream; Doug Barker; Micky Minhas

(57) ABSTRACT

Embodiments of our technology provide a method, system, and media for presenting relevant information incident to attempting to present information that is unavailable by way of a website. One embodiment of the method includes receiving a request to present a desired web page, determining that the desired web page is unavailable for presentation, determining search criteria associated with the request, dynamically generating a second web page that includes search results that were obtained based on the search criteria, and presenting the second web page on a display device.

7 Claims, 12 Drawing Sheets

SMART, SEARCH-ENABLED WEB ERROR PAGES

INTRODUCTION

Often, users interact with the Internet to locate information of interest. Sometimes this interaction is by way of hyperlinks or other options such as by manually typing an intended address (URL). But sometimes hyperlinks are broken, or data is otherwise misentered, resulting in an error.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

At a high level, this disclosure describes presenting relevant data such as results from a dynamically generated query or applicable advertisement information incident to encountering an error (such as a broker link or other). When an error is encountered in a web-type environment, dynamically generated content is presented instead of a static error page. Our technology dynamically generates useful content by satisfying a search result that was derived from information associated with the broken hyperlink, mistyped URL, requesting web page, and the like.

BRIEF DESCRIPTION OF THE SEVERAL VIEWS OF THE DRAWINGS

Embodiments of our technology are described in detail below with reference to the drawing figures, which form a part of this disclosure, and are incorporated by reference herein, and wherein.

DETAILED DESCRIPTION

Figure 1:
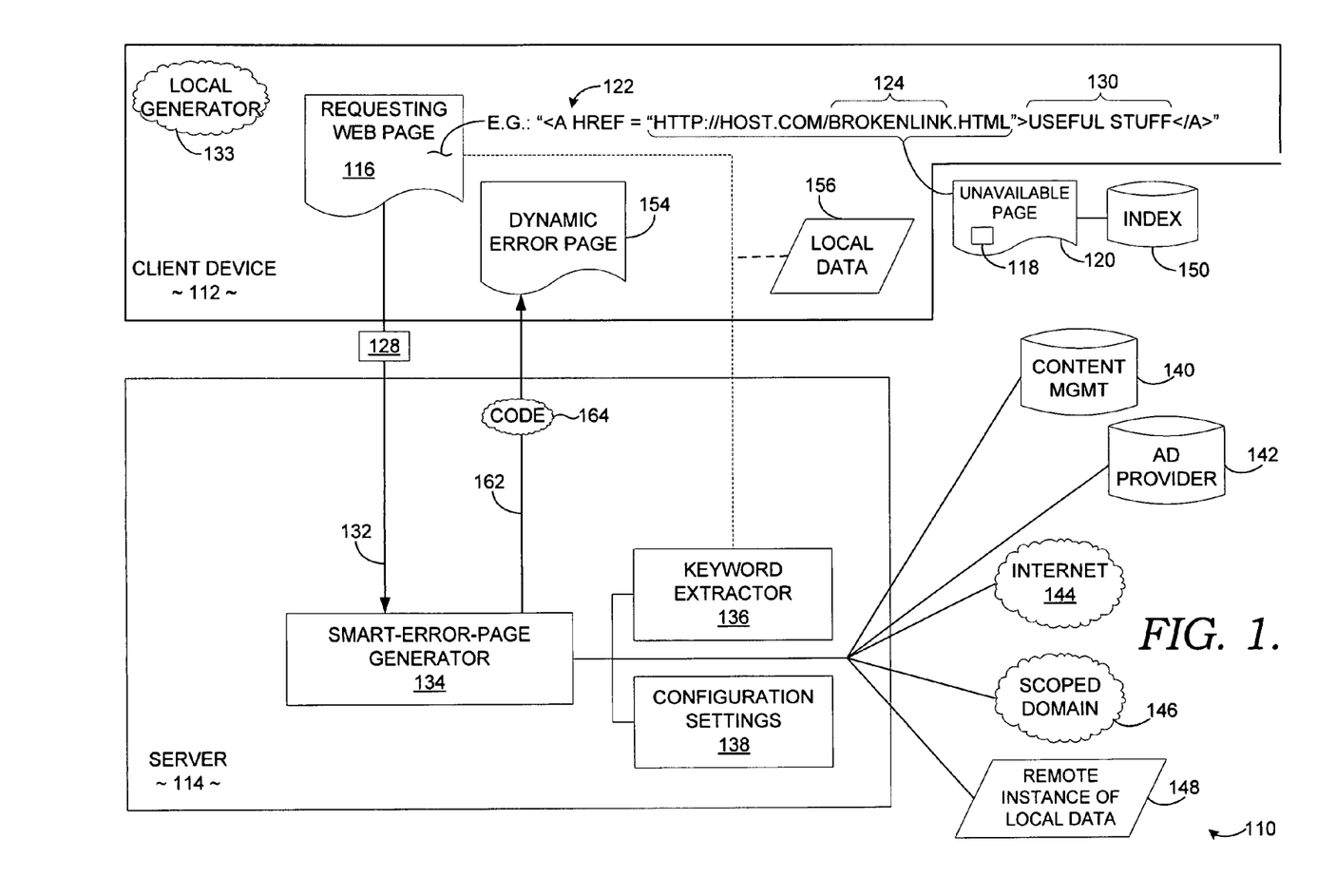
FIG. 1 depicts an illustrative operating environment suitable for practicing an embodiment of our technology.

With initial reference to FIG. 1, an illustrative operative environment suitable for practicing an embodiment of our technology is provided and referenced generally by the numeral 110. Operating environment 110 includes a first computing device and a second computing device, which we refer to as client device 112 and server 114. Each is schematically described, by way of illustration, in greater detail in connection with FIG. 2, which we will briefly describe to provide a general overview of either device 112, 114.

Figure 2:
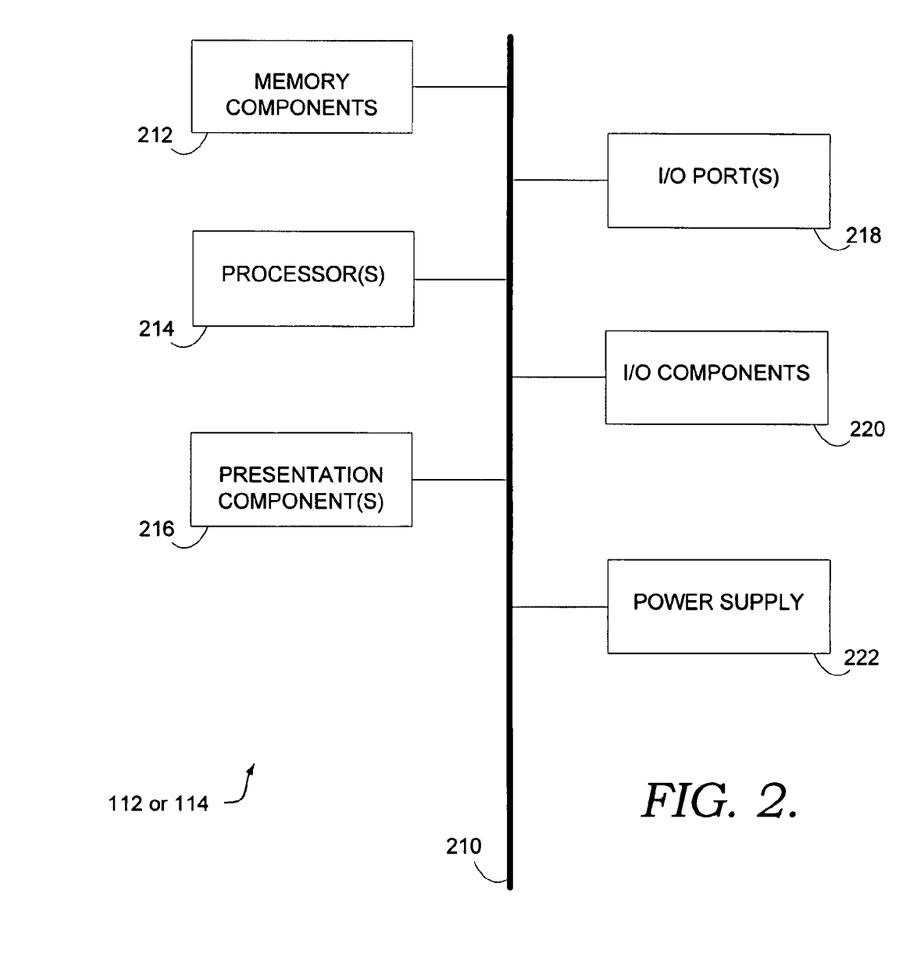
FIG. 2 depicts a block diagram illustrating certain components of an illustrative computing device suitable for practicing an embodiment of our technology.

In FIG. 2, a diagrammatic block diagram of the computing devices is provided, which device might take the form of a conventional computer as well as a consumer electronics device, such as an Internet-connected watch, mobile phone, and the like. Computing devices 112/114 may take on a variety of forms, including, for example, a computing device such as a gaming console, a client computer, a server computer, variations thereof such as laptop computers and palmtop computers, and in some embodiments devices such as PDAs and smart phones. As shown in FIG. 2, a bus 210 couples one or more memory components 212 to one or more processors 214, various presentation components 216, input/output ports 218, input/output components 220, and at least one power supply 222. Other devices including lower-level aspects of the shown devices are not shown so as to not obscure a description of technology.

Memory components 212 include things such as a hard drive, volatile memory (such as RAM), buffers, and the like. The one or more processors 214 control overall data communications throughout computing devices 112, 114. Illustrative presentation components 216 include a video card as well as a monitor or other presentation device. Input/output ports 218 provide connectivity to peripheral components such as printers, digital cameras, and the like. Actual input/output components may be things like printers and the like. A power supply 222 provides power to run the computing devices. Not all of the components shown in FIG. 2 need to be present in order to make up a computing device but are shown for illustrative purposes in connection with describing an embodiment of our technology.

Although the various blocks of FIG. 2 are shown with lines for the sake of clarity, in reality, delineating various components is not so clear and, metaphorically, the lines would more accurately be gray and fuzzy. For example, one may consider a presentation component such as a display device to be an I/O component. Also, processors have memory. We recognize that such is the nature of the art and reiterate that the diagram of FIG. 2 is merely illustrative of an exemplary computing device that can be used in connection with one or more embodiments of the present invention.

Computing devices 112, 114 typically include a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other medium that can be used to encode desired information and be accessed by the computing device.

Returning to FIG. 1, client device 112 is illustratively shown to include a requesting web page 116. Requesting web page can be any web document or item that requests desired content. We illustratively show desired content by way of numeral 118 in connection with what we refer to as an unavailable page 120. Desired content 118 need not be content that is within a web page, such as unavailable page 120. We show desired content 118 as being associated with unavailable page 120 for ease of explanation, but also show it separately to convey that desired content 118 might be an entity on its own.

What is referred to as unavailable page 120 will also be referred to herein as a desired page. That is, a user or other entity might attempt to reach desired content 118 by interacting with hyperlink 122. Hyperlink 122 can be any link or locator that is usable to reach or attempt to reach target content. Thus, a user may desire to receive content 118 or web page 120, but it might not be available. Thus, we will variously refer to unavailable page 120 as web page 120 or desired web page 120.

Link 122 includes multiple parts. For example, a portion of link 122 includes portion 124, which is depicted as "brokenlink." We use the term "brokenlink" to easily convey to the reader that the object of discussion 122 is a broken link in one embodiment. But in reality, portion 124 might include descriptive information. For example, if a person were interested in apples, then URL 122 might take on a format along the lines of "www.groceries.com/apples.html." In this example, "apples" provide information indicative of the type of information that link 122 would be associated with; namely, apples. By way of another example, URL 122 might be "www.store.com/tires.html." In this example, "tires.html" indicates that link 122 would likely be associated with tires.

At a step 126, a request 128 is sent from requesting web page 116 by way of client device 112. In some embodiments, request 128 includes URL 122. In other embodiments, what we denote as "useful stuff" 130 is also sent with request 128. "Useful stuff" 130 is a placeholder that is meant to illustratively convey the text that is presented on a display device when URL 122 is rendered. It 130 is often referred to as "anchor text" by ordinary skilled artisan. When we refer to "useful stuff" 130, we are referring to the corresponding anchor text of a given link.

It is commonplace for websites to hyperlink a given set of words, and then show that those words are actually hyperlinked by way of an underscore for example. The words that are actually shown are sometimes different than the hyperlink itself. The hyperlink 122 itself is somewhat cryptic, and does not lend itself to being very readable by human beings. Thus, user-friendly words such as "useful stuff" 130 are provided, and then associated with a link such as link 122. The fact that "useful stuff" 130 was wording that was selected to be hyperlinked indicates that it too might convey aspects of the content associated with link 122. Thus, as we will explain in greater detail below, this information 130 can be inspected to determine characteristics associated with content 118 or web page 120.

At a step 132, request 128 is received by a receiving component, which we are referring to as a smart-error-page generator 134. We use this term to convey aspects of the functionality exposed by the receiving component, and do not mean to attach any term of art or narrowing terminology to receiving component 134. Almost assuredly, any given implementor might refer to such a receiving component 134 by a different name, but referring to it as a smart-error-page generator helps convey to the reader the disclosure functional aspects that it carries out.

For example, one of the functional aspects that smart-error-page generator 134 carries out is to determine that request 128 is requesting information that is not presentable. The information might not be presentable for a variety of reasons. For example, link 122 might be broken. That is, link 122 might point to a target component that no longer exists. In other instances, web page 120 might exist, but is now restricted or has otherwise been denoted as unavailable to a requester. In other embodiments, a user might have inadvertently typed in the wrong URL such that URL 122, and thus request 128, point to content that never existed.

We want to reinforce that the lines and boundaries depicted in FIG. 1 are not meant to convey hard boundaries. To the contrary, almost all boundaries would be better shown as gray and fuzzy to convey that they are not necessarily discreet components in the real world. We show them the way we do to help comply with drafting rules and regulations associated with patent applications, but do not intend them to be limiting in nature.

Smart-error-page generator 134 is shown as being coupled to a keyword extractor 136 as well as some configuration settings 138. Still further, in one embodiment, smart-error-page generator 134 (as well as keyword extractor 136 and/or configuration settings 138) are coupled to datasets that include a content management dataset 140, an ad provider 142, the Internet 144, a scoped domain 146, and a remote instance of local data 148.

Figure 4A:
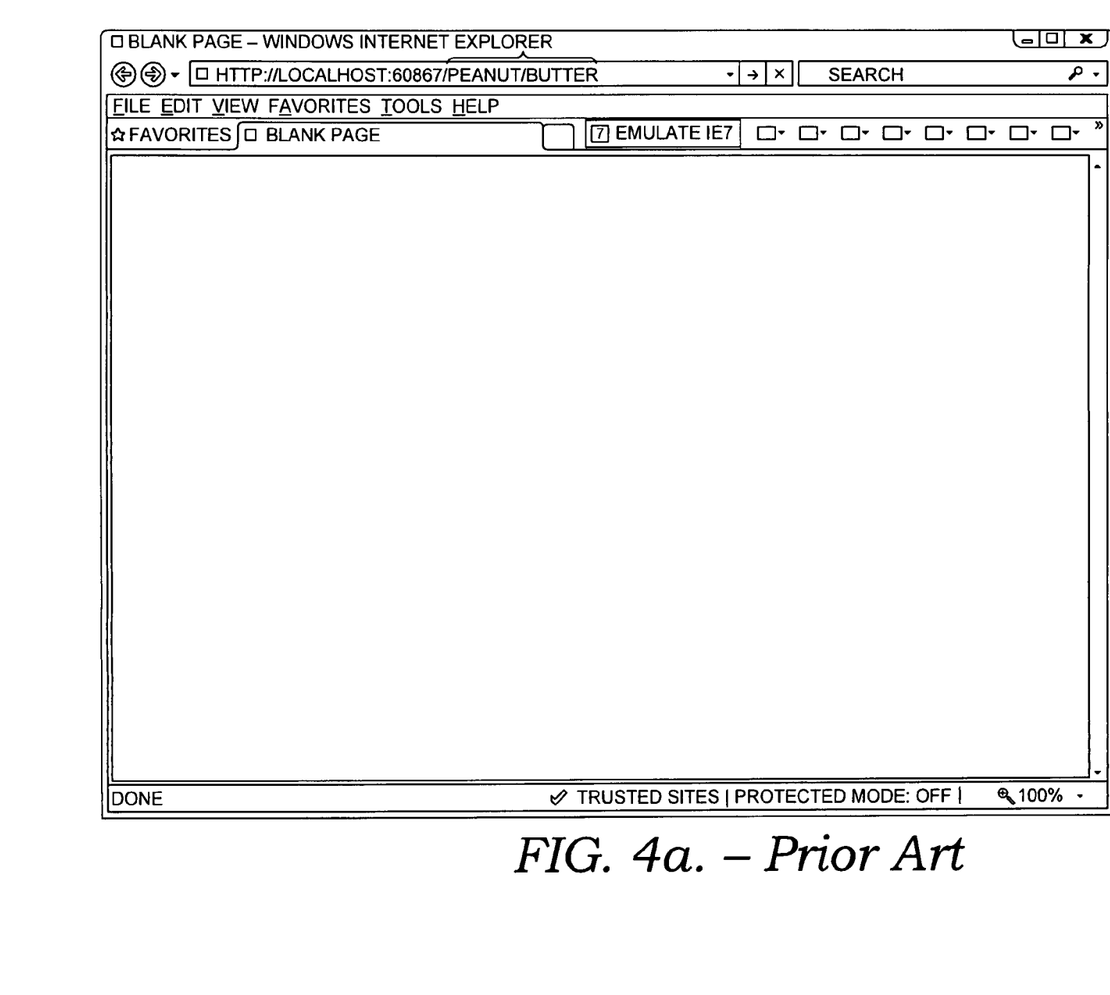
FIGS. 4A-4D depict illustrative prior-art examples of error pages.
Figure 4B:
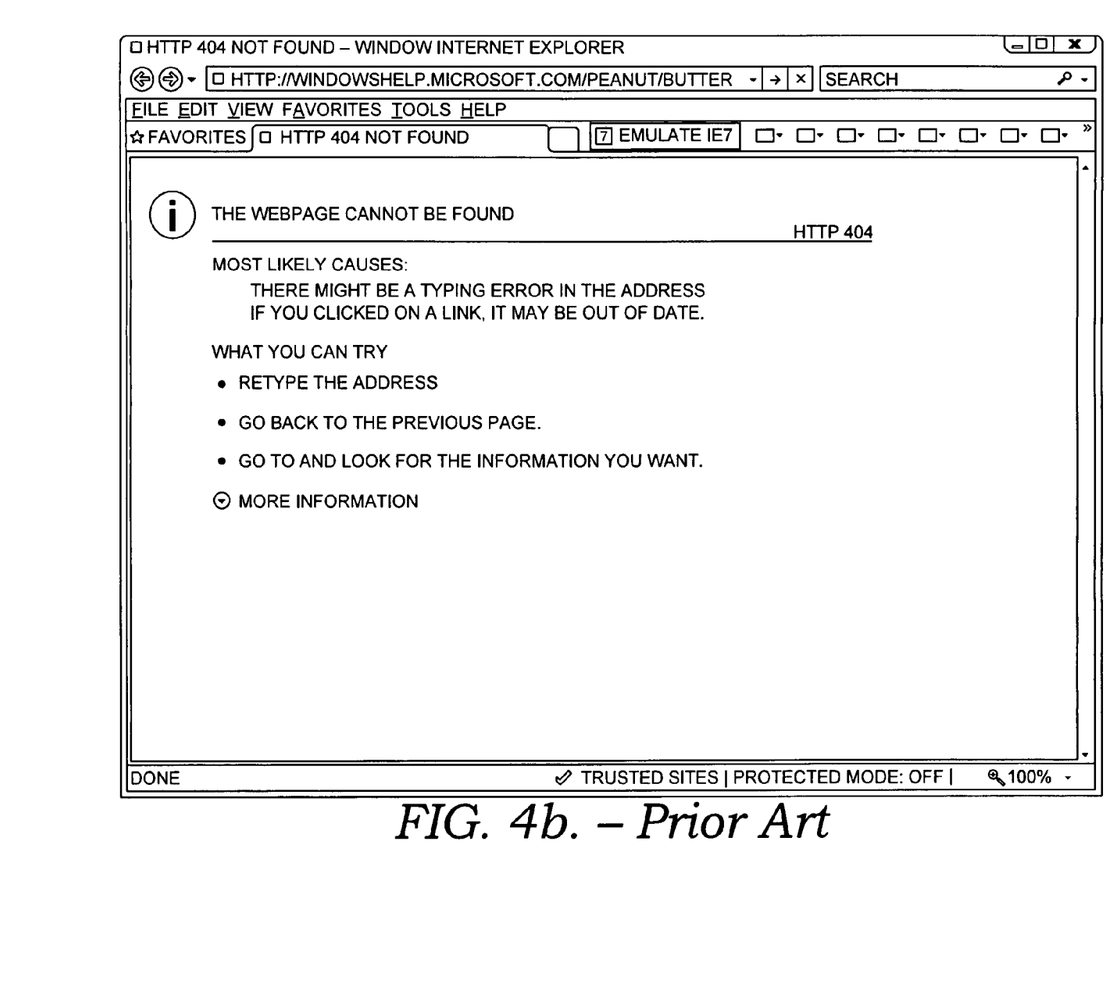
Figure 4C:
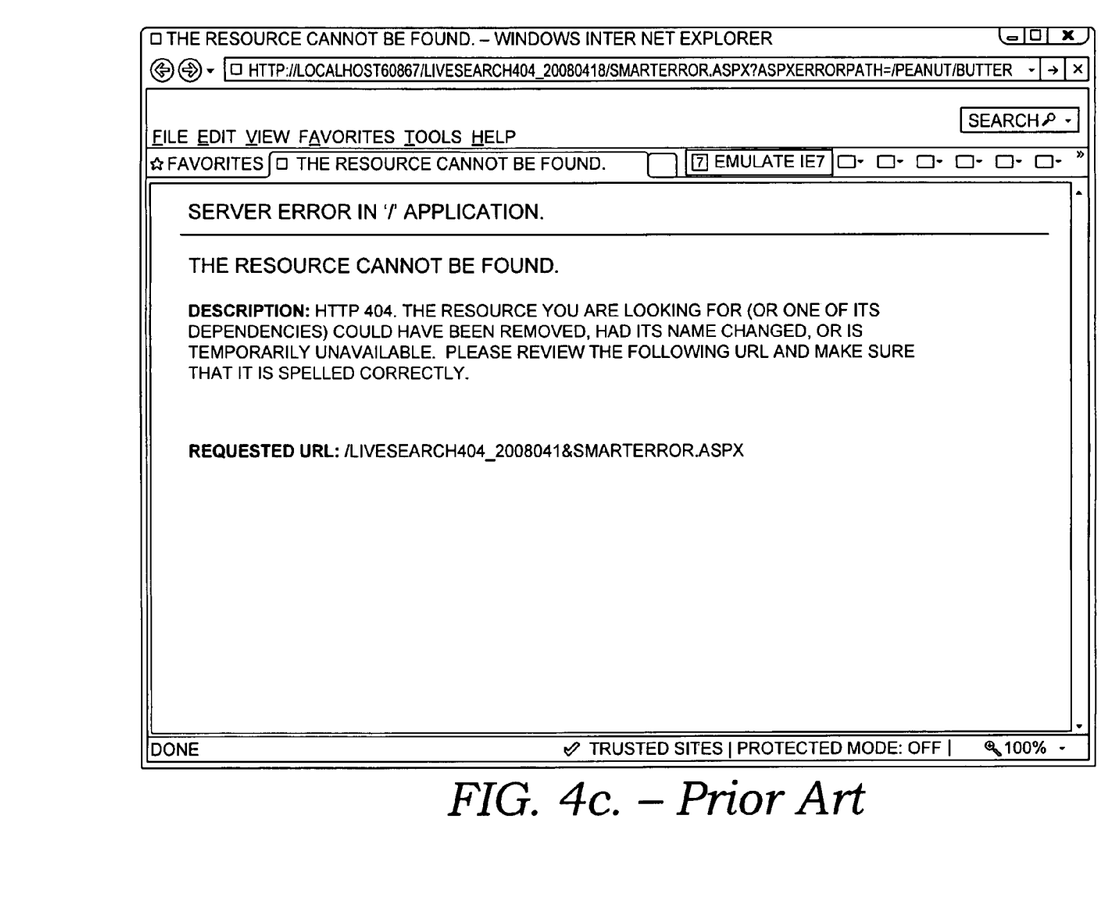
Figure 4D:
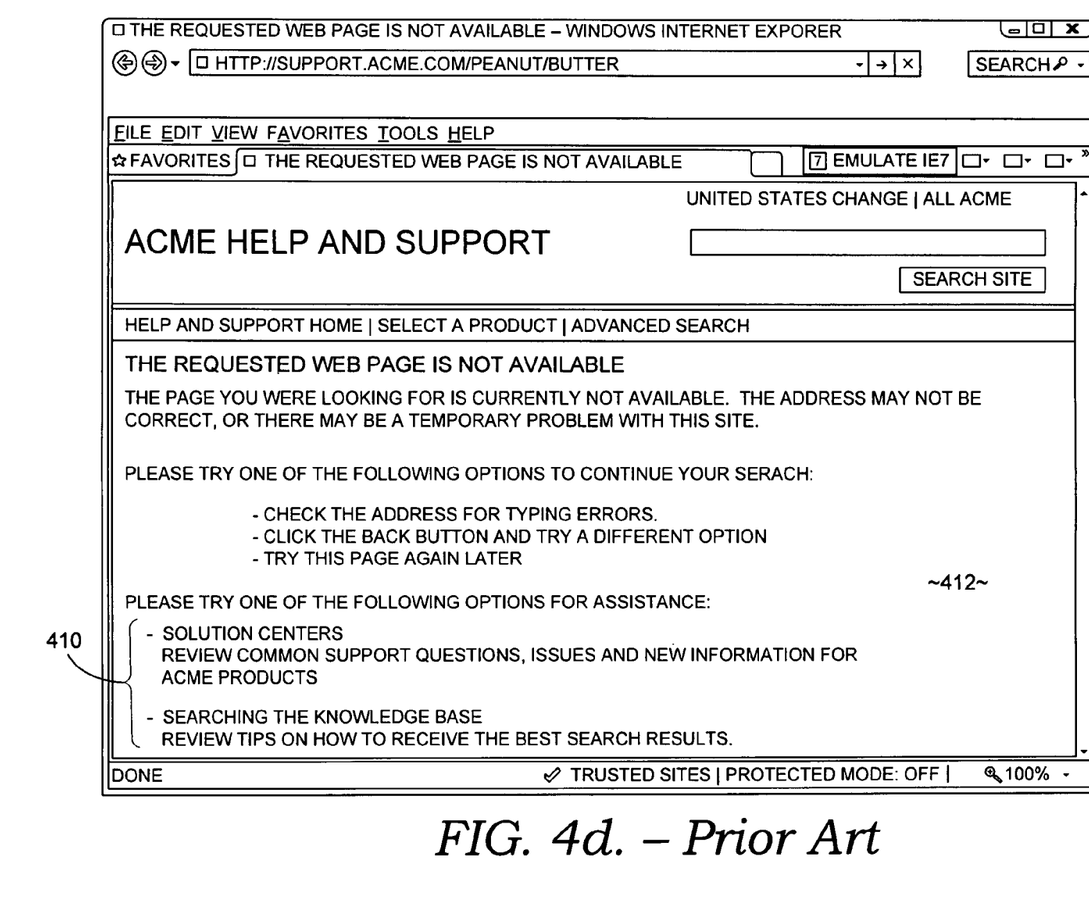

Keyword extractor 136 is responsible for gleaning search criteria associated with request 128 in one embodiment. As previously mentioned, keyword extractor might form a part of generator 134 or other module, but we call it out by name to help illustrate aspects of our technology. As mentioned, keyword extractor 136 determines search criteria associated with request 128. Absent our technology, incident to receiving request 128, which is associated with bad information, server 114 might return an unhelpful web page. Unhelpful web pages are web pages that are static, and offer very little help, and very little intelligence, to a user associated with request 128. By way of example consider FIG. 4A, which depicts a blank page, which is one potential result associated with bad request 128. FIG. 4B depicts still another example, which merely indicates that an error, such as an "http404" error was encountered. Still further, FIG. C illustrates another prior-art example associated with a database-type error. By way of a final illustration, FIG. 4D indicates a web page that tries to include some helpful information such as options 410, but again, is static. That is, no matter what information was provided by way of request 128, web page 412 of FIG. 4D will be presented.

In contrast to the prior-art examples, an embodiment of our technology returns a smart-error-page that is made up of dynamically generated helpful information. The information is helpful in that it is created based on results returned from a query that was created based on information such as information in URL 122, or requesting web page 116 (including metadata such as tags or keywords associated therewith), or the information in "useful stuff," or even unavailable page 120 or desired content 118. In some situations, content 118 or desired web page 120 might no longer be available for viewing, but might have been stored prior to having been placed into an unavailable state. For example, content 118 or web page 120 might be cached somewhere, or information describing either might be stored in an index such as index 150. Accordingly, index 150 can be referenced to help determine applicable keywords.

As mentioned, keyword extractor 136 helps extract applicable keywords that can be used to provide a query to search for relevant results. We illustratively show a set of results 152 being returned to smart-error-page generator 134 at some point. As briefly mentioned, keywords might be extracted from requesting web page 116. If requesting web page 116 were a web page that presented information dominantly related to a given topic, then one might assume that link 122, within web page 116, might also be related to the same topic. Accordingly, information associated with requesting page 116 could be inspected to determine search criteria that can then be used to see the query that is levied against the various types of data sources we have described.

Of course, requesting web page 116 does not have to be referenced in all embodiments, but might in some. In other embodiments, information within URL 122 itself is analyzed. For example, URL portion 124 might include descriptive words that indicate what unavailable web page 120 was about. We have previously described examples associated with "apples" or "tires" above. Thus various tags, including those not shown, could be inspected to help determine search criteria in one embodiment.

In still another embodiment, information such as "useful stuff" 130 could be analyzed to determine search criteria. Whatever information is included within an anchor tag, or, for example occurs prior to the "<a/>" element. That information itself might form all or part of the query.

In some embodiments, information 130 is not provided along with request 128. In such an embodiment, keyword extractor 136 would interact with web page 116 to determine information 130, and then utilize it as would be appropriate.

Some of the various implementations that we were discussing could be carried out by way of a set of configuration settings 138. Configuration settings might indicate what types of sources are to be searched. For example, in one embodiment, an implementor might wish to have only its website searched. That is, when it comes time to deliver a set of results that will be used to develop a dynamic error page 154, one might wish to limit the results returned to any web pages of its own website. Perhaps a user does not wish to have customers leave its website. By way of example, if reallybigstore.com were to implement our technology, then any search results 152 returned would be limited in scope to those items associated with web pages that make up reallybigstore.com.

A content-management dataset 140 might serve as a dataset upon which to levy a developed query. Various types of content might make up content-management dataset 140. For example, content-management dataset 140 might include videos, games, blogs, and any other variety on types of data sources that might be relevant.

Ad provider 142 might also be the basis to levy a search against. That is, keyword extractor 136 might extract applicable keywords, and then search for relevant advertisements by way of ad provider 142, and return indications of those advertisements to a requesting device by way of dynamic error page 154 in one embodiment. In this way, one receives relevant advertisements that might be advertising the type of thing initially sought by way of URL 122. These advertisements could be integrated into dynamic error page 154 on the fly or in predetermined advertising areas.

Internet 144 could also be searched by way of a general purpose search engine. That is, if one clicked on hyperlink 122 that might be associated with an obscure object, then Internet 144 might be searched in general to determine any instances of the type of subject matter associated with URL 122 that can be found. This might include searching a wide array of websites such as option sites, news sites, government sites, and the like.

We have previously mentioned how a scoped domain 146 scenario might be applicable. This would be the example where a user wishes to scope the results to one or more specific domains. Perhaps vendors have agreements in place that help keep customers within a specific pool of domains. In such an example, a scoped-domain implementation could be implemented by way of option 146.

Option 148 indicates a remote instance of local data. We show an instance of local data 156 on client device 112. Local data 156 might be an indexed set of information on a user's computer for example. For example, perhaps a user employs an indexing program that indexes the user's information. In this setting, the individual's own computer could be searched for results that might be applicable to URL 122. That is, perhaps a user has received e-mails associated with tires or apples, and when URL 122 turns out to be a broken hyperlink that should have pointed to tires or apples, our technology would present instances of information associated with tires or apples or anything else that is already resident on his or her machine, such as previous e-mails or cached advertisements.

In some embodiments, a remote instance 148 of that local data resides somewhere. Perhaps a user does not wish to make available to an inspecting agent all data on his or her machine. But the user is comfortable utilizing, for example, a backup service or some other online storage solution in which the user stores personal information. This such online-storage solution could be an example of a remote instance of local data 148. We do not need to imply that all local data 156 needs to be included in remote instance 148.

Figure 5:
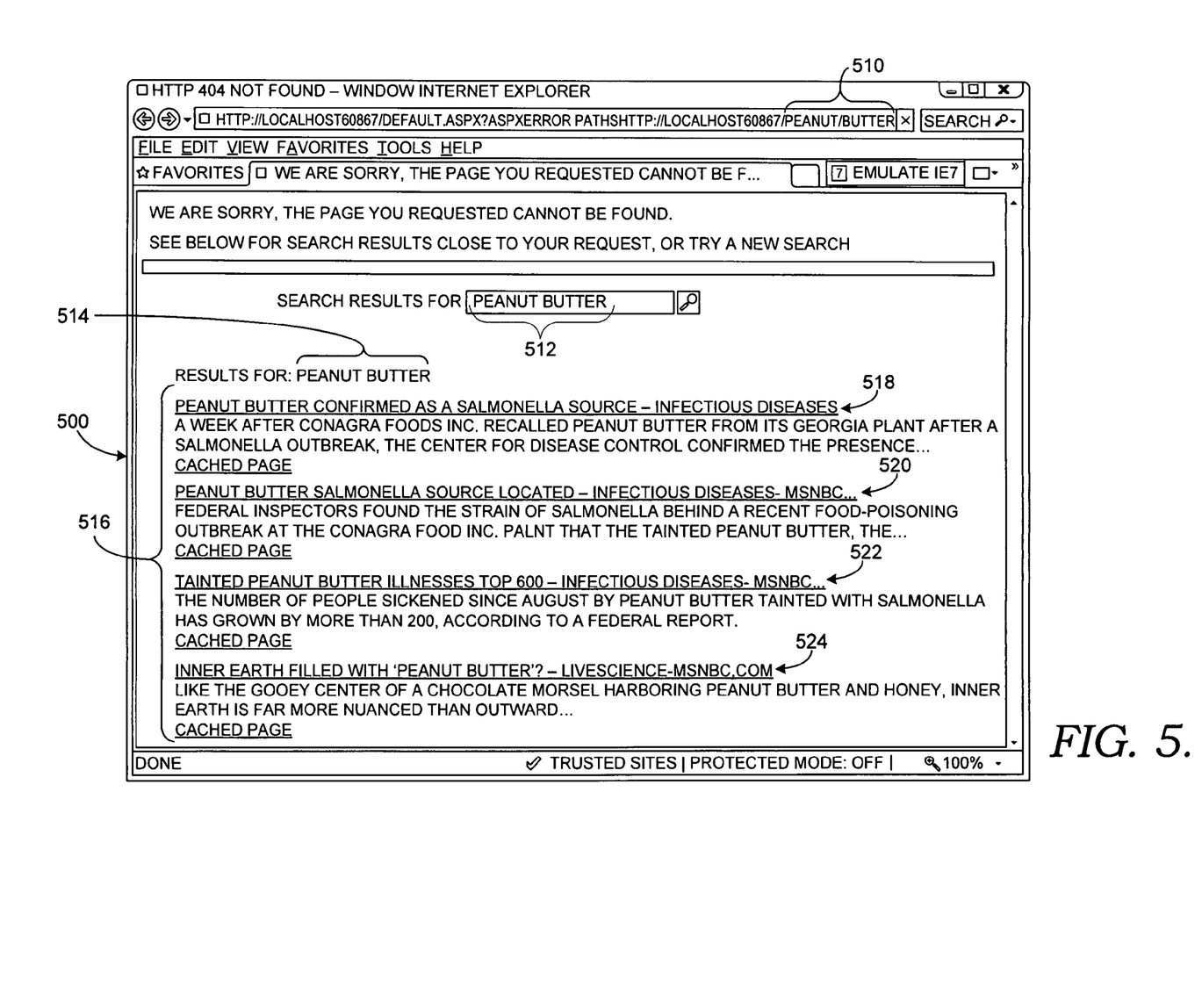
FIGS. 5-6 depict two illustrative examples of smart-error pages that were generated according to an embodiment of our technology.

At a step 162, results 152 are returned to smart-error-page generator. In some embodiments the results are passed to a client web browser for rendering. This might include, at a step 162, sending a portion of code 164 to client device 112, which dynamically generates dynamic error page 154. Dynamic error page 154 now includes the information from a search result that took into account information relevant to link 122. By way of example, a screenshot 500 in FIG. 5 depicts an illustrative example of a dynamic error page 154.

As can be seen from URL portion 510, a user was apparently attempting to access a link associated with peanut butter. Accordingly, by way of our technology, search results were derived based on a query 512 that includes "peanut butter" as a constraint. Thus, an indication 514 illustrates an initial set of results 516 that are relevant to peanut butter. We illustratively show four results, which are prefaced by headings 518, 520, 522, and 524. Here, server 114 provided information about the page that a user typed in. According to an embodiment of our technology, information from the prior requesting page could have also been extracted and used to source query 512.

Figure 6:
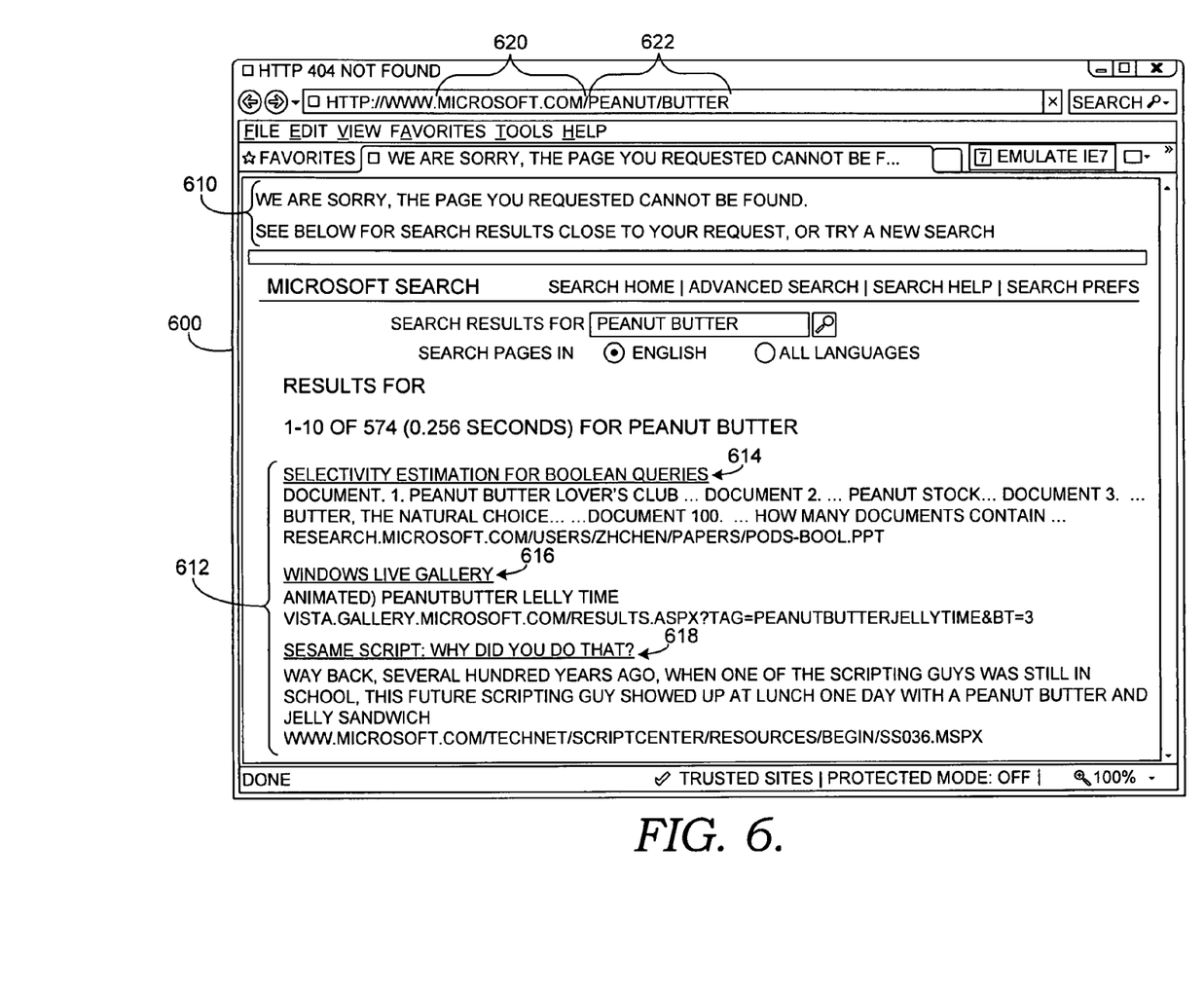

By way of another example, consider a screenshot 600 of FIG. 6. In one embodiment, an indication 610 might be provided to a user that his or her specific request could not be granted. But instead of presenting merely a static page, our technology contemplates presenting dynamic web page 600 that includes a set of search results 612 that are relevant to desired content 118 or web page 120 that, for some reason, is unavailable. In this specific example, by way of illustration, return links 614, 616, and 618 are all scoped to the same domain "Microsoft.com" 620. We had previously described an example of scoping a results set to one or more domains. This is an example of such an implementation. Again, it might have been the case that ending portion 622 is the actual URL that was attempted to be navigated to. But when navigation to the desired web page was unavailable, instead of presenting a static error page, we present a smart error page that includes results that will likely be relevant to a user.

In one way, we are tempting to glean the user's intent, and then capitalize on that intent to provide a better user experience by providing a set of results associated with the gleaned user's intent.

Figure 7:
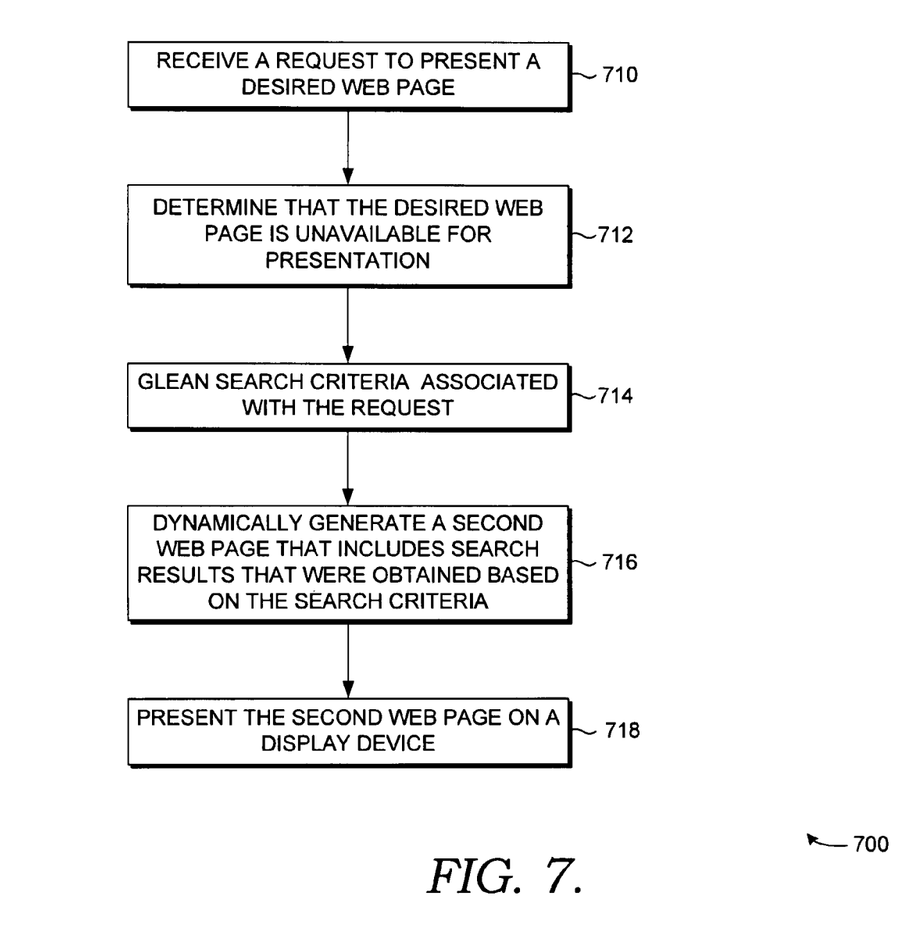
FIGS. 7-9 depict three illustrative embodiments for presenting relevant information incident to attempting to present information that is no longer available for presentation.

Turning now to FIG. 7, an illustrative method for presenting relevant information incident to attempting to present unpresentable information is provided and referenced generally by the numeral 700. At a step 710, a request is received to present a desired web page. For example, an illustrative desired web page might be page 120 (or content 118 thereon). In one embodiment, the request was received by way of a hyperlink.

At a step 762, a determination is made that the desired web page is unavailable for presentation. In one embodiment this could include determining that the hyperlink did not point to the desired web page. In other embodiments, the hyperlink, such as link 122, might point to a restricted web page that the specific user is not authorized to view.

At a step 714, search criteria associated with the request is gleaned. In various embodiments, this gleaning could include analyzing all or a portion of a hyperlink, prior content that was associated with the desired web page (such as the information indexed in index 150), a requesting web page from which the request was received (such as web page 116), or a requesting device that initiated the request (such as client device 112). Regarding the last example, user-profile information might also be sent up with request 128. The user-profile information might include information about the requesting device, client device 112, which might be useful in returning even more relevant results at 152 in one embodiment of our technology.

Analyzing at least a portion of a hyperlink such as 122 might include determining a set of keywords from the hyperlink. By way of example, keywords might include "brokenlink," "apples," "tires," or "useful stuff."

At a step 716, a second web page is dynamically generated that includes search results that were obtained based on the search criteria. By way of illustration, dynamic error page 154 might be such a second web page. In one embodiment, it would generate it by way of code 164 which includes rendering code that describes to the client device 112 how to construct dynamic error page 154.

At a step 718, the second web page is presented on a display device. Although we only provided two illustrative web pages, 412 and 500, they are representative in nature and depict examples of web pages that could be presented on a display device.

Figure 3:
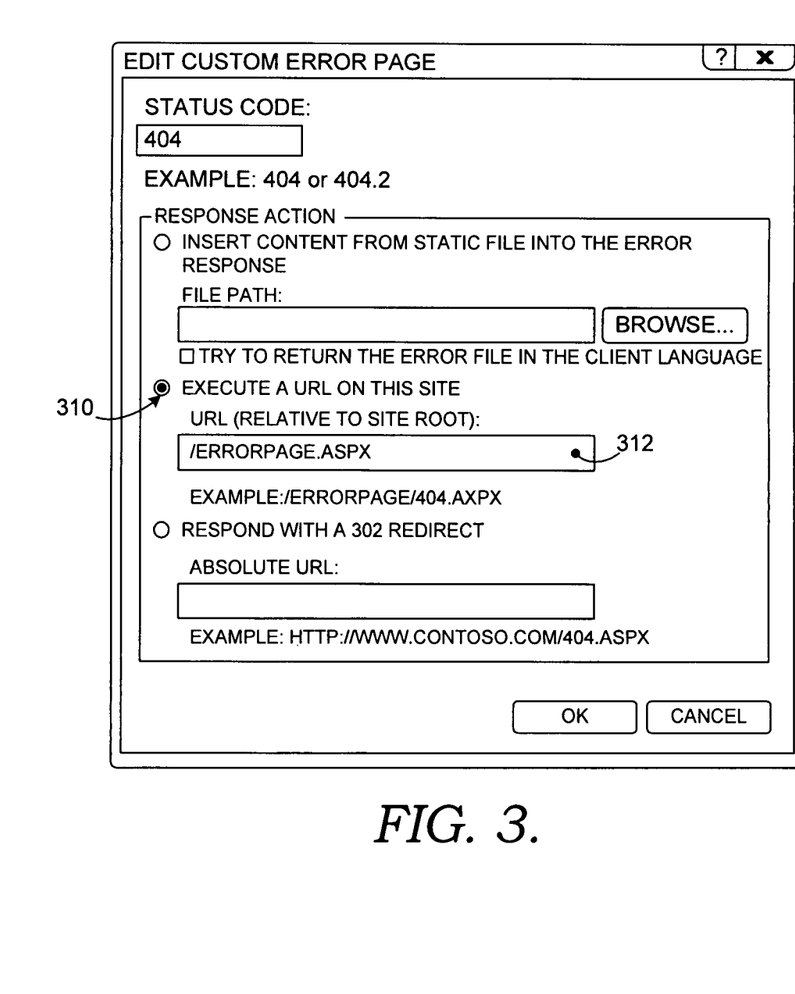
FIG. 3 depicts an aspect of an illustrative configuration setting according to an embodiment of our technology.
Figure 8:
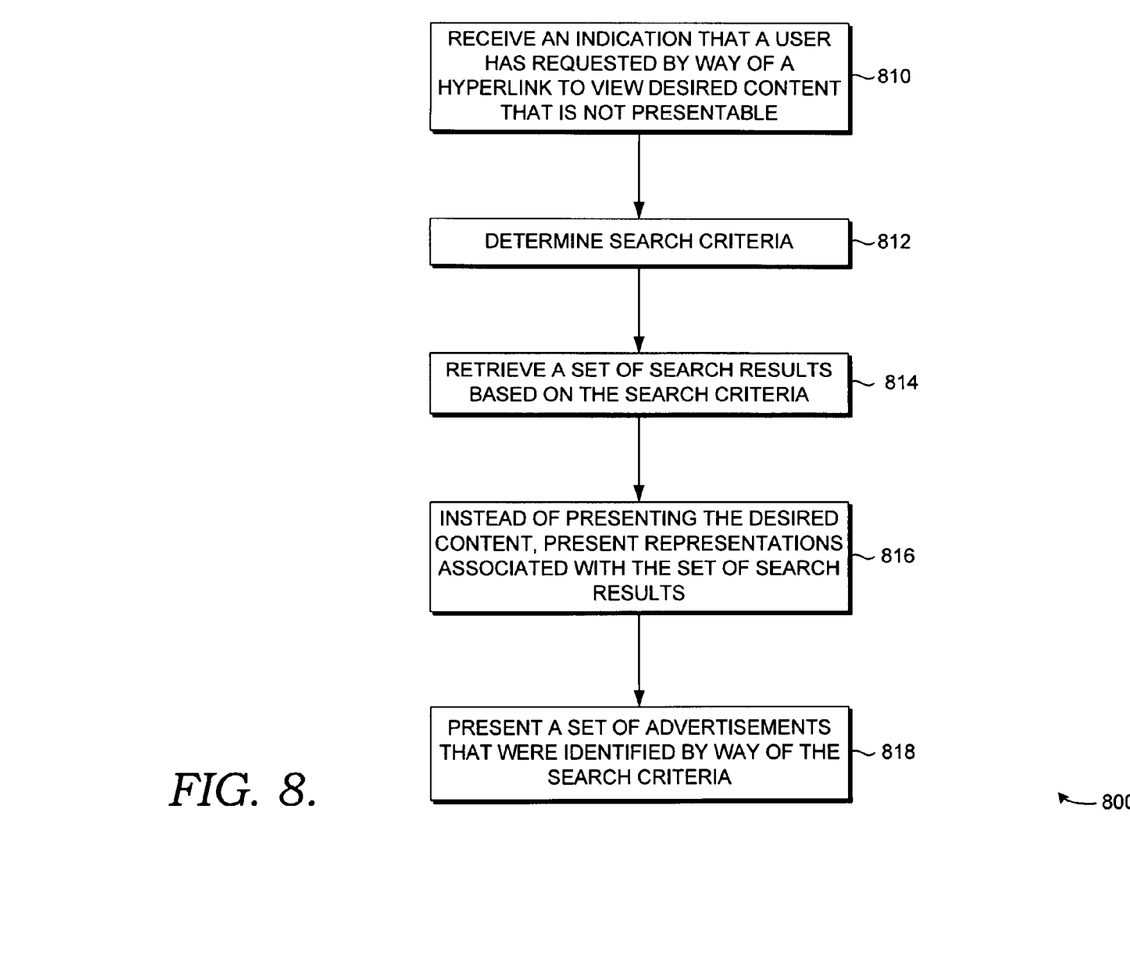

Turning now to FIG. 8, another illustrative method for presenting relevant information incident to attempting to present unpresentable information is provided and referenced generally by the numeral 800. At a step 810, an indication is received that a user has requested by way of a hyperlink to view desired content that is not presentable. In one embodiment, the desired content, such as that of 118, was previously reachable by a first web page, such as web page 120. Now, web page 120 might no longer be available for presentation. This being the case, smart-error-page generator 134 will trigger a search-criteria determination process at a step 812. In other embodiments, step 812 might be initiated by another component associated with server 114. In some embodiments, this process is launched by way of a configuration setting such as configuration setting 310 shown in FIG. 3. This configuration setting, which might be one of the configuration settings 138, indicates what is to happen when a type of error is encountered. By way of illustration, text box 312 indicates that a certain script is to be launched. This script could form all or part of smart-error-page generator 134 in one embodiment.

At a step 814, a set of search results is retrieved based on the search criteria. We have previously explained the various types of datasets that could be searched in connection with retrieving a set of search results, such as search results 152.

At a step 816, instead of presenting the desired content, representations associated with the set of search results are presented. In some embodiments, these representations are the actual search results that make up the set, and in other embodiments they include information associated with the search results instead of the actual search results themselves. For example, perhaps a set of pictures or other items are associated with the search results, and those are presented. We do not mean to make a stark and sharp distinction, but do intend to make clear that we include such representations to be included within the scope of search results that are presented.

If desired, at a step 818, a set of advertisements can be presented that were identified by way of the search criteria, as previously mentioned.

Figure 9:
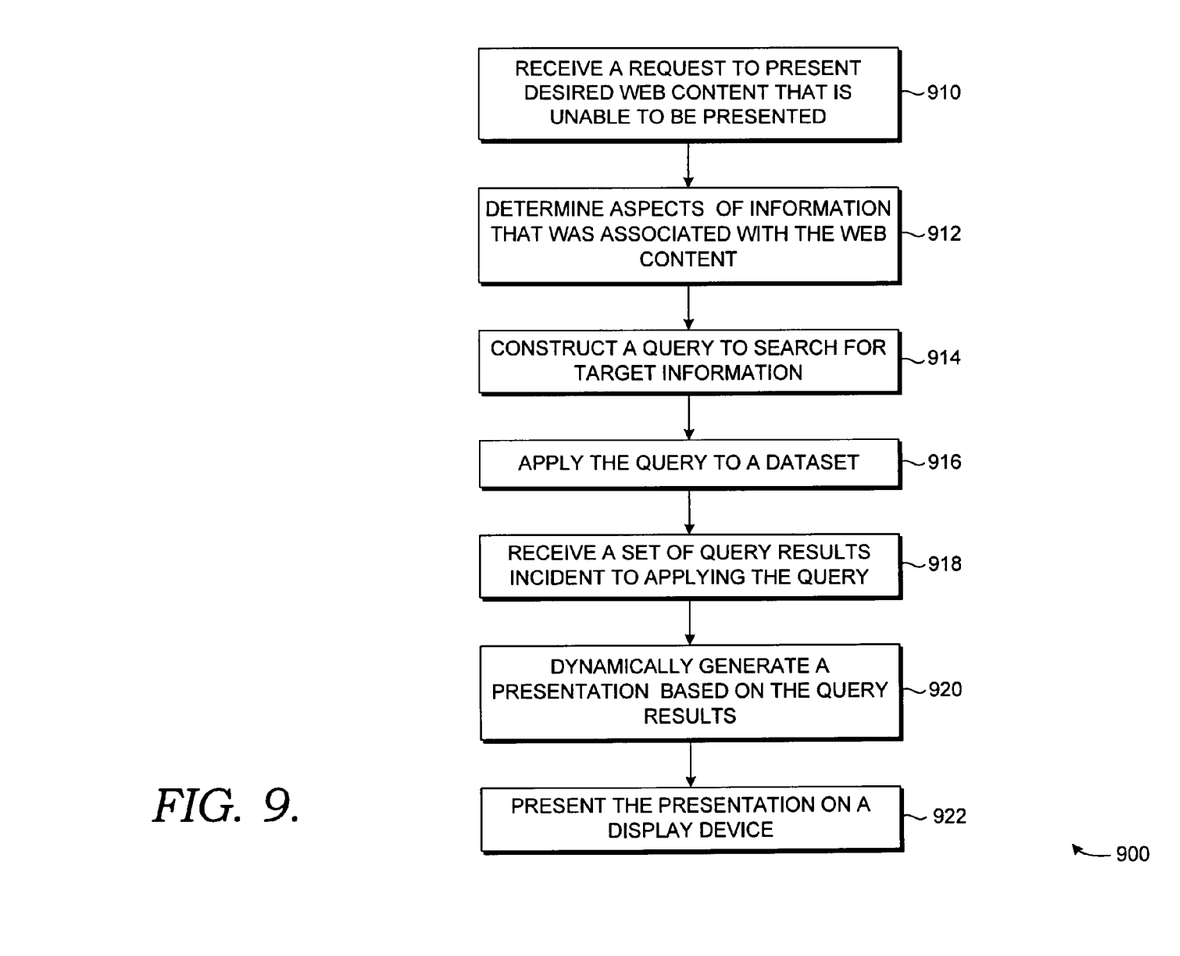

Turning now to FIG. 9, a final illustrative method for presenting a smart-error-page is provided and referenced generally by the numeral 900. At a step 910, request to present desired web content, such as web content 118, that is unable to be presented is received. Unable to present this content, our technology does not merely present a stagnant error page. Rather, at a step 912, aspects of information that were associated with the web content are determined. Aspects might include the desired web content itself. In other embodiments, aspects of the information might include a content index derived from the web content. That is, aspects of information might not be limited to content 118 itself, but the information in index 150 that was derived from content 118. In still other embodiments, an illustrative aspect might include a determined type of data that web content 118 was. For example, a determination might be made that the type of information sought was an audio file, a video file, a game, a news article, information associated with a personalized site, and the like. Perhaps by knowing what type of file URL 122 was originally associated with, a better determination can be made as to what type of search results should be returned to a user. At a step 914, a query is constructed to search for target information that might be relevant. At a step 916, the query is applied to a dataset, which include all or a portion of the various datasets that we have described.

At a step 918, a set of query results are received incident to applying the query. For example, results at 152 might be returned. At a step 920, a presentation is dynamically generated based on the query results. In one embodiment the presentation takes the form of a dynamic error page such as that of 154. We also mean to convey by numeral 154 that we contemplate presenting other types of presentations. For example, perhaps what is rendered is a document or a spreadsheet or a video file, which some might attempt to argue is technically not a web page, but what we wholly intend to include in the scope of the definition of how we use the term.

At a step 922, the presentation is presented on a display device.

Many different arrangements of the various components depicted, as well as components not shown, are possible without departing from the spirit and scope of our technology. For example, the functionality of various server-side steps could be provided locally. That is, what smart-error-code generator 134 does, local generator 133 could facilitate. In some embodiments, it 133 has access to configurations settings 138, which allows an administrator to configure aspects of our technology. Embodiments of our technology have been described with the intent to be illustrative rather than restrictive. Alternative embodiments will become apparent to those skilled in the art upon reading this disclosure. A skilled artisan may develop alternative means of implementing the aforementioned technology.

It will be understood that certain features and subcombinations are of utility and may be employed without reference to other features and subcombinations and are contemplated within the scope of the claims. Not all steps listed in the various figures need be carried out in the certain order described.

The invention claimed is:

1. A method of presenting relevant information incident to attempting to present unpresentable information associated with a website, the method comprising:

receiving, from a computing device, a request to present a desired web page;

determining that the desired web page is unavailable for presentation;

accessing a cache index to identify a cached version of the desired web page associated with the request;

analyzing the cached version of the desired web page to determine information associated with the cached version of the desired web page including content associated with the cached version of the desired web page;

generating a set of search criteria based solely on the information determined to be associated with the cached version of the desired web page;

using the set of search criteria generated solely from the information determined to be associated with the cached version of the desired web page, querying the computing device and an advertisement provider to identify a set of search results that meet the search criteria;

dynamically generating a second web page other than the cached version of the desired web page that includes the search results that were identified by querying the computing device and the advertisement provider based on the set of search criteria; and presenting the second web page on a display device.

2. The method of claim 1, wherein the request is received by way of a hyperlink.

3. The method of claim 2, wherein determining that the web page is unavailable for presentation includes determining that the hyperlink does not point to the desired web page.

4. The method of claim 2, wherein determining that the web page is unavailable for presentation includes determining that the web page exists but is denoted to not be presented to a requester.

5. The method of claim 4, wherein generating the set of search criteria further comprises analyzing one or more of:
   at least a portion of the hyperlink;
   a requesting webpage from which the request was received;
   metadata associated with said requesting webpage; and
   a requesting device that initiated the request.

6. The method of claim 5, wherein analyzing the at least a portion of the hyperlink includes determining one or more keywords from the at least a portion of the hyperlink.

7. The method of claim 1, wherein analyzing the cached version of the desired web page to determine information further includes
   determining a file type associated with the cached version of the desired web page.

\* \* \* \* \*